United States Patent [19]

Miano

[11] 4,144,288
[45] Mar. 13, 1979

[54] SODIUM TETRABORATE PENTAHYDRATE AS A SMOKE SUPPRESSANT FOR STYRENIC RESINS

[75] Inventor: Jeffrey D. Miano, Norristown, Pa.

[73] Assignee: Pennwalt Corporation, Philadelphia, Pa.

[21] Appl. No.: 870,971

[22] Filed: Jan. 20, 1978

[51] Int. Cl.$^2$ .................. C08K 3/38; C08K 5/06; C08K 5/09

[52] U.S. Cl. .................. 260/880 R; 260/45.7 R; 260/45.75 P; 260/45.8 A; 260/45.95 G

[58] Field of Search .................. 260/45.7 R, 45.7 RL, 260/45.95 G, 2.5 FP

[56] References Cited

U.S. PATENT DOCUMENTS

| | | | |
|---|---|---|---|
| 3,385,819 | 5/1968 | Gouinlock, Jr. | 260/45.7 RL |
| 3,751,396 | 8/1973 | Gall | 260/40 R |
| 3,826,766 | 7/1974 | Howell et al. | 260/45.7 RL |
| 3,865,760 | 2/1975 | Pitts et al. | 260/45.7 R |
| 3,920,606 | 11/1975 | Diebel et al. | 260/2.5 FP |
| 3,956,231 | 5/1976 | Moore et al. | 260/45.7 RL |
| 3,965,214 | 6/1976 | Nametz et al. | 260/45.7 RL |
| 4,003,862 | 1/1977 | Albright | 260/2.5 FP |
| 4,016,137 | 4/1977 | Anderson et al. | 260/45.95 G |
| 4,032,507 | 6/1977 | Anderson | 260/45.95 G |
| 4,032,509 | 6/1977 | Lee | 260/45.7 R |

*Primary Examiner*—Hosea E. Taylor
*Assistant Examiner*—R. A. White

[57] ABSTRACT

A composition comprising a styrenic resin admixed with sodium tetraborate pentahydrate and a brominated aromatic compound is provided that is no only flame retarded but also is smoke suppressed.

9 Claims, No Drawings

SODIUM TETRABORATE PENTAHYDRATE AS A SMOKE SUPPRESSANT FOR STYRENIC RESINS

Background of the Invention

1. Field of the Invention

This invention relates to a flame retarded and smoke suppressed composition of a styrenic resin, sodium tetraborate pentahydrate and a brominated aromatic compound.

2. Description of the Prior Art

Smoke and especially dense smoke is a hazard during a fire since the smoke can obscure means of escape and hamper firefighting measures. Hence, it is desirable to develop building materials that emit reduced amounts of smoke during combustion as an added safety feature. The composition of the present invention meets this requirement.

Styrenic resins are used in furniture, pipes, appliances, electrical applications and in building materials. These resins produce a substantial amount of smoke when burned. Furthermore, commonly used flame retardants such as organic bromine compounds (with antimony oxide as a synergist) frequently increase smoke production. The use of sodium borate-antimony oxide flame retardants (U.S. Pat. Nos. 3,385,819 and 3,816,307) and PVC smoke suppressants (U.S. Pat. No. 3,560,441) gives an increase in smoke when used in polystyrene flame retarded with brominated aromatic compounds.

Examples of prior art smoke suppressants for styrene-based resins, that are impractical for commercial use because they are relatively expensive are: the metal-coordination compounds such as the metal phthalocyanines (U.S. Pat. No. 3,825,520) and metal 8-hydroxyquinolates (U.S. Pat. No. 3,766,157); the organometallic compounds such as tetraphenyl lead (U.S. Pat. No. 3,793,404) and ferrocene; and more recently, molybdenum oxide (U.S. Pat. No. 3,956,231).

Although sodium borate compounds are well known in the art; it has now been discovered that sodium tetraborate pentahydrate is effective in reducing smoke evolution of styrenic resins formulated with brominated aromatic flame retardants. Sodium tetraborate pentahydrate has the dual advantage of being inexpensive and not discoloring the resin. Other borates such as sodium tetraborate decahydrate, commonly called borax, and anhydrous sodium tetraborate were found to be ineffective in reducing smoke from styrenic resins.

STATEMENT OF THE INVENTION

The present invention is directed to a flame retarded and smoke suppressed resin composition comprising 100 parts of a styrenic resin admixed with 1 to 50 parts of a brominated aromatic compound and about 10 to 50 parts of sodium tetraborate pentahydrate with about 15 to 30 parts of the borate being preferred. All parts are by weight unless otherwise indicated.

DETAILED DESCRIPTION OF THE INVENTION

A variety of styrenic resins can be used in this invention, such as:

1. Homopolymers — polystyrene, poly(chlorostyrene), poly (bromostyrene), poly($\alpha$-methyl styrene), poly(vinyl toluene), poly(vinylnaphthalene), and the like.
2. Copolymers — acrylonitrile-butadiene-styrene (ABS), styrene-acrylonitrile (SAN), high, low, and medium impact polystyrenes and the like. 3. Mixtures — polystyrene and poly($\alpha$-methyl styrene), poly (vinyl toluene), and poly(chlorostyrene), polystyrene and poly(vinylnaphthalene), polystyrene and styrene-acrylonitrile (SAN).

The preferred styrenic resins of this invention are: polystyrene, impact polystyrene and acrylonitrile-butadiene-styrene(ABS) copolymers.

Representative examples of aromatic flame retardants that can be used in this invention are: decabromodiphenyl oxide, octabromodiphenyl oxide, hexabromodiphenyl oxide, tetrabromodiphenyl oxide, dibromodiphenyl oxide, tetrabromophthalic anhydride, tribromophthalic anhydride, dibromophthalic anhydride, tetrabromoterephthalic acid, tribromoterephthalic acid, 1,2-bis-(2,4,6-tribromophenoxy)ethane, 1,2-bis-pentabromophenoxyethane, 1,2-bis-tetrabromophenoxyethane, 1,2-bis-dibromophenoxyethane, tetrabromobisphenol A, pentabromoethylbenzene, tetrabromoethylbenzene, tribromoethylbenzene, dibromoethylbenzene, bromoethylbenzene, hexabromobenzene, pentabromobenzene, tetrabromobenzene, tribromobenzene, dibromobenzene, pentabromotoluene, tetrabromotoluene, tribromotoluene, dibromotoluene, decabromobiphenyl, octabromobiphenyl, hexabromobiphenyl, tetrabromobiphenyl, pentabromophenol, tetrabromophenol, tribromophenol, dibromophenol, polyoxyethylene tetrabromophthalates, decabromodiphenyl sulfone, octabromodiphenyl sulfone, hexabromodiphenyl sulfone, tetrabromodiphenyl sulfone, dibromophenyl sulfone, decabromodiphenyl amine, octabromodiphenyl amine, hexabromodiphenyl amine, tetrabromodiphenyl amine, dibromodiphenyl amine, dibromoaniline, tribromoaniline, tetrabromoaniline, pentabromoaniline, tetrabromocatechol, tribromocatechol, dibromocatechol, tetrabromophthalimide, tribromophthalimide, dibromothiophene, tetrabromothiophene, dibromopyridine, tetrabromopyridine, pentabromopyridine, decabromodiphenyl sulfide, octabromodiphenyl sulfide, hexabromodiphenyl sulfide, tetrabromodiphenyl sulfide.

Preferred brominated aromatic compounds are decabromodiphenyl oxide, tetrabromophthalic anhydride and 1,2-bis(2,4,6-tribromophenoxy) ethane (see U.S. Pat. Nos. 3,862,085 and 3,907,744).

The resin may be treated with the flame retardant and smoke suppressant additives in any convenient manner. For example, blenders or mixers that are known in the art may be employed using a variety of techniques for the mixing thereof.

In the following examples the smoke suppressant and flame retardant additives are mixed with the styrenic resin with a high speed mechanical stirrer. An aliquot of 5.5 grams of the resulting mixture of resin and additives plus two sheets of glass fabric (Owen Corning Fiberglas #236 Surfacing Material, 0.010-inch thickness) is then molded at 155°–170° C. and 10,000 psi into 3×3×0.0313-inch plaques. The glass fabric prevents the plastic from dripping when burned. The resulting non-drip conditions more closely duplicate a large scale fire [see Jacobs, Journal of Fire and Flammability, 6,347 (1975)]. The plaques are burned in an Aminco NBS Smoke Chamber using the method described in ASTM Special Technical Publication 422 (1969) and NFPA-258-T "Smoke Generated by Solid Materials", May, 1974, using the flaming mode of operation. All results are the average of two or more values and are reported as the maximum corrected specific optical density ($D_{mc}$). Percent smoke reduction is calculated using the equation:

$$\% \text{ Reduction} = \frac{D_{mc}(\text{control}) - D_{mc}(\text{sample})}{D_{mc}(\text{control})} \times 100$$

The following examples illustrate the present invention but are not intended to limit the invention thereto.

EXAMPLES 1-12

The following examples show the effect of several smoke suppressants in general purpose polystyrene (a homopolymer) containing 15 phr (parts per hundred parts resin) of 1,2-bis(2,4,6-tribromophenoxy)ethane. The data indicated in Table 1 show that sodium tetraborate pentahydrate is a much more effective smoke suppressant than the other commercially available sodium tetraborates. It is also more effective than sodium metaborate, sodium perborate, zinc borate and potassium borate.

Table I

| Example No. | Smoke Suppressant | Smoke Suppressant Content (phr) | $D_{mc}$ | % Reduction |
|---|---|---|---|---|
| 1 (control) | — | — | 730 | — |
| 2 | $Na_2B_4O_7.5H_2O$ | 15 | 482 | 34 |
| 3 | $Na_2B_4O_7.10H_2O$ (borax) | 15 | 705 | 3 |
| 4 | $Na_2B_4O_7$ (anhydrous) | 15 | 592 | 19 |
| 5 | $K_2B_4O_7.4H_2O$ | 15 | 708 | 3 |
| 6 | $Na_2B_2O_4.8H_8H_2O$ | 15 | 725 | 1 |
| 7 | $Na_2BO_3.4H_2O$ | 15 | 620 | 15 |
| 8 | Zinc Borate | 15 | 704 | 4 |
| 9 | Tetraphenyl Lead | 6.6 | 686 | 6 |
| 10 | Ferrocene | 15 | 475 | 35 |
| 11 | Fe-8-Hydroxyquinolate | 33.2 | 511 | 31 |
| 12 | Fe-phthalocyanine | 31.6 | 635 | 13 |

EXAMPLES 13-15

The following examples and Table II indicate that the combination of antimony oxide (0.25 phr) and sodium tetraborate hydrates (as described in U.S. Pat. No. 3,816,307 as a flame retardant) are ineffective as smoke suppressants for general purpose polystyrene in the presence of 1,2-bis(2,4,6-tribromophenoxy) ethane (10 phr).

Table II

| Example No. | Smoke Suppressant | Smoke Suppressant Content (phr) | $D_{mc}$ | % Reduction |
|---|---|---|---|---|
| 13 (control) | — | — | >765 | — |
| 14 | $Na_2B_4O_7.5H_2O$ | 15 | >765 | (a) |
| 15 | $Na_2B_4O_7.10H_2O$ | 15 | >765 | (a) |

(a) Cannot calculate since so much smoke is generated that all readings are off-scale.

EXAMPLES 16-19

The examples in Table III indicate that sodium tetraborate pentahydrate is superior as a smoke suppressant to sodium tetraborate decahydrate and a fused antimony oxide sodium tetraborate mixture (U.S. Pat. No. 3,560,441) in general purpose polystyrene flame retarded with 15 phr decabromodiphenyl oxide.

Table III

| Example No. | Smoke Suppressant | Smoke Suppressant Content (phr) | $D_{mc}$ | % Reduction |
|---|---|---|---|---|
| 16 (control) | — | — | 666 | — |
| 17 | $Na_2B_4O_7.10H_2O$ | 15 | 630 | 5 |
| 18 | $Na_2B_4O_7.5H_2O$ | 15 | 468 | 30 |
| 19 | Fused $Sb_2O_3$-$Na_2B_4O_7$ 80:20 | 5 | >765 | Increase |

EXAMPLES 20-22

The examples in Table IV indicate that sodium tetraborate pentahydrate is more effective as a smoke suppressant than sodium tetraborate decahydrate in general purpose polystyrene flame retarded with 15 phr tetrabromophthalic anhydride.

Table IV

| Example No. | Smoke Suppressant | Smoke Suppressant Content (phr) | $D_{mc}$ | % Reduction |
|---|---|---|---|---|
| 20 (control) | — | — | 765 | — |
| 21 | $Na_2B_4O_7.5H_2O$ | 15 | 599 | at least 22 |
| 22 | $Na_2B_4O_7.10H_2O$ | 15 | 765 | (a) |

(a) Cannot calculate since so much smoke is generated that all readings are off-scale.

EXAMPLES 23-25

In Table V the examples indicate that sodium tetraborate pentahydrate is more effective as a smoke suppressant than sodium tetraborate decahydrate in ABS flame retarded with 15 phr of 1-2-bis(2,4,6-tribromophenoxy) ethane.

Table V

| Example No. | Smoke Suppressant | Smoke Suppressant Content (phr) | $D_{mc}$ | % Reduction |
| --- | --- | --- | --- | --- |
| 23 (control) | — | — | 779 | — |
| 24 | $Na_2B_4O_7.5H_2O$ | 15 | 452 | 42 |
| 25 | $Na_2B_4O_7.10H_2O$ | 15 | 561 | 28 |

EXAMPLES 26-28

Table VI indicates that sodium tetraborate pentahydrate is more effective as a smoke suppressant than sodium tetraborate decahydrate in high impact polystyrene containing 15 phr 1,2-bis(2,4,6-tribromophenoxy)ethane.

Table VI

| Example No. | Smoke Suppressant | Smoke Suppressant Content (phr) | $D_{mc}$ | % Reduction |
| --- | --- | --- | --- | --- |
| 26 (control) | — | — | 718 | — |
| 27 | $Na_2B_4O_7.5H_2O$ | 15 | 446 | 38 |
| 28 | $Na_2B_4O_7.10H_2O$ | 15 | 623 | 13 |

What is claimed is:

1. A flame retarded and smoke suppressed composition consisting essentially of 100 parts of a styrenic resin selected from the group consisting of polystyrene, poly(chlorostyrene), poly(bromostyrene), poly(α-methyl styrene), poly(vinyltoluene), poly(vinylnaphthalene), acrylonitrile-butadiene-styrene terpolymer, styrene-acrylonitrile copolymer, high, low and medium impact polystyrenes, and mixtures thereof admixed with about 1 to 50 parts of a brominated aromatic flame retardant and about 10 to 50 parts of sodium tetraborate pentahydrate.

2. A composition of claim 1 wherein said styrenic resin is polystyrene.

3. A composition of claim 1 wherein said styrenic resin is acrylonitrile-butadiene-styrene terpolymer.

4. A composition of claim 1 wherein said styrenic resin is high-impact polystyrene.

5. A composition of claim 1 wherein said brominated aromatic flame retardant is 1,2-bis(2,4,6-tribromophenoxy)ethane.

6. A composition of claim 1 wherein said brominated aromatic flame retardant is decabromodiphenyl oxide.

7. A composition of claim 1 wherein said brominated aromatic flame retardant is tetrabromophthalic anhydride.

8. A composition of claim 1 wherein sodium tetraborate pentahydrate is in the amount of 15 to 30 parts.

9. A process of producing a styrenic resin having smoke suppressed properties comprising adding 100 parts of a styrenic resin selected from the group consisting of polystyrene, poly(chlorostyrene), poly(bromostyrene), poly(α-methyl styrene), poly(vinyltoluene), poly(vinylnaphthalene), acrylonitrile-butadiene-styrene terpolymer, styrene-acrylonitrile copolymer, high, low and medium impact polystyrenes, and mixtures thereof to a mixing vessel along with about 1 to 50 parts of a brominated aromatic flame retardant and about 10 to 50 parts of sodium tetraborate pentahydrate and intimately mixing the mixture to produce a flame retarded and smoke suppressed resin.

* * * * *